United States Patent [19]
Logan

[11] 3,770,296
[45] Nov. 6, 1973

[54] LONGITUDINALLY ADJUSTABLE TRAILER KINGPIN WITH HYDRAULIC LOCK

[76] Inventor: Lloyd E. Logan, 3595 Redwood Highway, Grants Pass, Oreg.

[22] Filed: May 5, 1972

[21] Appl. No.: 250,810

[52] U.S. Cl............................. 280/407, 280/433
[51] Int. Cl............................................ B62d 53/08
[58] Field of Search................................. 280/407

[56] References Cited
UNITED STATES PATENTS

| | | | |
|---|---|---|---|
| 2,889,154 | 6/1959 | DeLay............................ | 280/407 R |
| 3,254,903 | 6/1966 | Rodney.......................... | 280/407 R |
| 3,198,548 | 8/1965 | Lund.............................. | 280/407 R |
| 2,923,560 | 2/1960 | Anderson....................... | 280/407 R |
| 2,495,943 | 1/1950 | Peterson........................ | 280/407 X |
| 2,838,324 | 6/1958 | Dalton............................ | 280/407 R |

Primary Examiner—Leo Friaglia
Assistant Examiner—Randall A. Schrecengost
Attorney—Harvey B. Jacobson

[57] ABSTRACT

A kingpin assembly for a trailer has a kingpin mounted on a member arranged in a cavity of an enclosed, hollow, fluid-tight housing. The member is in substantially continuous peripherial contact with the housing for forming a piston. A slot in the housing permits movement of the member and kingpin parallel to the longitudinal direction of a trailer. A passage provided with a valve permits selective flow from one side of the member to the other of a fluid which fills the cavity and passage. When the valve is in a passage blocking position, the member will be locked in a predetermined position. Moving the valve to a passage opening position will permit the member and kingpin to be moved to another position.

10 Claims, 5 Drawing Figures

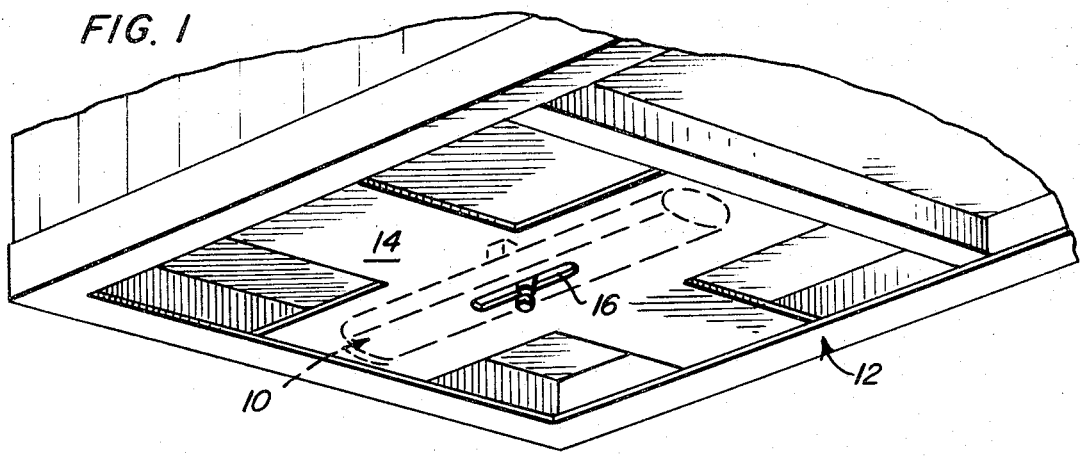
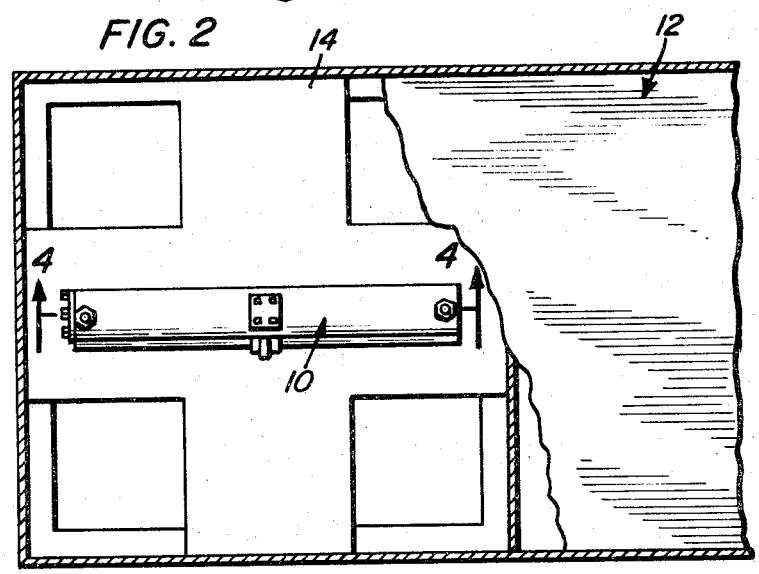
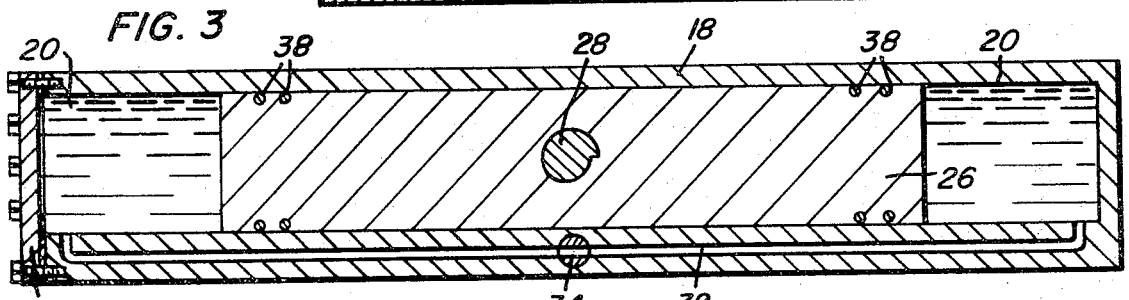
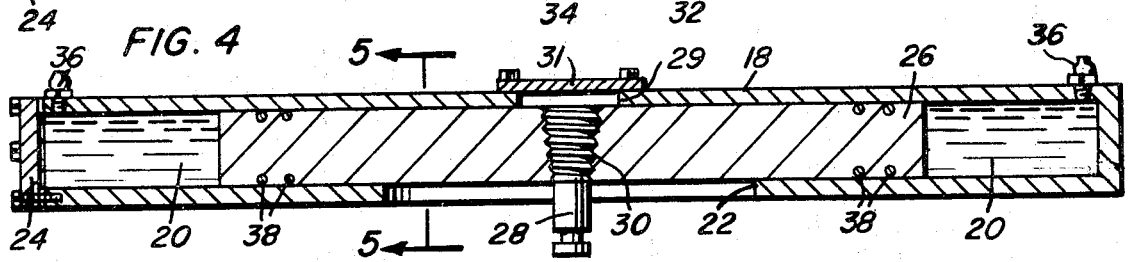

LONGITUDINALLY ADJUSTABLE TRAILER KINGPIN WITH HYDRAULIC LOCK

BACKGROUND OF THE INVENTION

1. Field of the Invention

This invention relates to a kingpin assembly which permits variation in the distribution of weight on the axles of a semi-trailer rig. That is, it permits the shifting of weight from a rear group of axles to a front group of axles and vice versa to facilitate compliance with various load limit regulations.

2. Description of the Prior Art

Devices are known--such as shown in, for example, U.S. Pat. No. 2,923,560 and No. 3,198,548, which permit a kingpin to be longitudinally adjustably mounted on a trailer so that by manual manipulation of mechanical fasteners the kingpin may be moved forwardly and rearwardly in relation to the trailer. These known devices, however, require complicated mechanical structure which may, for example, be subject to freezing if not used regularly.

SUMMARY OF THE INVENTION

It is an object of the present invention to provide a kingpin assembly which permits shifting of axle loads in a simple and reliable manner.

This and other objects are achieved according to the present invention by providing a kingpin assembly for a trailer and the like having a kingpin mounted on a member movably arranged in a cavity provided in an enclosed, hollow, fluid-tight housing and in substantially continuous peripheral contact with the housing for forming a piston. A slot communicating with the cavity is provided in the housing for permitting the kingpin to pass through a wall of the housing. By arranging the slot to extend perpendicular to the trailer axles, a movement of the member and kingpin will cause a shift in the axle loads.

A passage is preferably provided for passing a fluid from one end to another, spaced end of the cavity by passing it around the member. A valve is arranged in this passage; the passage and valve forming a lock for the member when the valve is in a passage blocking position.

Advantageously, both the cavity and passage are filled with an incompressible fluid, such as a hydraulic fluid.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary, bottom perspective view showing a kingpin assembly according to the present invention arranged on a trailer.

FIG. 2 is a fragmentary, horizontal longitudinal sectional view, partly cut away, also showing a kingpin assembly according to the present invention mounted on a trailer.

FIG. 3 is a sectional view taken generally along the line 3—3 of FIG. 5.

FIG. 4 is a sectional view taken generally along the line 4—4 of FIG. 2.

FIG. 5 is a sectional view taken generally along the line 5—5 of FIG. 4.

DESCRIPTION OF THE PREFERRED EMBODIMENTS

Referring first to FIGS. 1 and 2 of the drawings, a kingpin assembly 10 according to the present invention is shown mounted on a trailer 12. Trailer 12 may be any suitable type of trailer, such as a semi-trailer. In the specific construction shown in FIGS. 1 and 2 of the drawings, kingpin assembly 10 is mounted to trailer 12 by a cross-shaped support member 14 provided with a slot 16 for permitting a kingpin to pass therethrough. Assembly 10 may be mounted on member 14 in any suitable, known manner, such as by screw fasteners. Support member 14 may be retained by angle members which form a frame for trailer 12.

Referring now to FIGS. 3 to 5 of the drawings, assembly 10 has an enclosed, hollow, fluid-tight housing 18 provided with a cavity 20 and a slot 22 communicating with cavity 20. A cover plate 24 may be arranged at at least one end of housing 18, and removably fastened thereto as by screw fasteners and the like. This plate 24 permits removal of a member 26 movably arranged in cavity 20 in substantially continuous peripheral contact with the walls of housing 18 for forming a piston therewith. A kingpin 28 is removably mounted to member 26. A hole 29 is provided in housing 18 opposite slot 22 for passing kingpin 28 into a threaded bore 30. Kingpin 28 is preferably provided with a threaded portion which threadedly engages with the threads in bore 30. A cover plate 31 is advantageously arranged over hole 29 in removable fashion as by screw fasteners. Kingpin 28 is arranged passing through slots 22 and 16, and extends away form the structure of trailer 12. Housing 18 preferably has an oval cross section, as best seen in FIG. 5, so that member 26 will not tend to rotate and put shear stresses on kingpin 28. As can be readily understood from the drawings and the above description, the construction of housing 18 and member 26 permits kingpin 28 to be movably mounted on a trailer 12 for shifting axle loads thereof.

A passage 32 is provided in housing 18 for passing a fluid from one end to another, spaced end of cavity 20 by passing around member 26. A valve 34 is arranged in passage 32 for selectively blocking and unblocking passage 32. Passage 32 and valve 34 form a lock for member 26 when valve 34 is in a position blocking passage 32. However, when valve 34 is moved to a position opening or unblocking passage 32, member 26 and kingpin 28 may be moved to a desired position. Once kingpin 28 is in a desired position, valve 34 may be closed and member 26 locked in place.

Preferably, an incompressible fluid fills passage 32 and cavity 20. A suitable, known hydraulic fluid may be used.

When a liquid is used as the fluid in cavity 20 and passage 32, as shown in FIGS. 3 and 4, air must be displaced from the system during filling. Advantageously, air bleeding vents 36 are provided to bleed this air from the system during filling and prevent member 26 from moving due to air compression when member 26 is locked. These vents 36 are preferably mounted in the position shown in FIGS. 4 and 5 of the drawings. A conventional grease fitting (not shown) may be provided on housing 18 for filling cavity 20 as by a coventional grease gun (not shown).

To assure that a fluid cushion is formed at each end stroke of member 26, the outlets of passage 32 must be spaced from the ends of housing 18. By proper dimensioning, member 26 will go by the particular opening of passage 32 even while valve 34 is still open. Thus, the opening of passage 32 will be plugged by member 26 and a cushion of fluid will be trapped between an end of housing 18 and member 26 when member 26 is in an extreme position. For maximum reliability and safety, passage 32 is preferably a part of housing 18, or is welded to housing 18 in such a manner as to eliminate vibration breakage.

A seal 38, such as one or more O-rings, is preferably arranged at each end of member 26. Occasionally, these seals will have to be changed. It is so the seals may be changed that removable cover plates 24 and 31 are provided.

Although it is to be understood that assembly 10 may be constructed in any size depending on particular requirements, a typical assembly 10 may have dimensions of, for example, 5 feet × 8 inches × 4 inches for housing 18 with member 26, 20 inches shorter to provide 10 inches clearance at each end thereof when kingpin 28 is centered in slot 22. In an assembly 10 of this size, slot 22 may be, for example, 20 inches long.

By using this invention, an operator of a semi-trailer truck may effectively redistribute the load on the axles for compliance with load limit regulations without necessitating use of a lift device to rearrange the load on the trailer. This reduces lost time which frequently occurs when the axle loads are checked on weighing scales after the truck leaves the loading area and one or more axles are found to be overloaded even though the total load may not be excessive. This condition necessitates that a lift device be used to rearrange the load or that the load be manually rearranged either of which may require considerable time which delays departure of the loaded truck toward its destination.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Apparatus for selectively varying the position of a kingpin in relation to a trailer, comprising, in combination:
    a. means for movably mounting a kingpin on a trailer for shifting axle loads, the mounting means including an enclosed, hollow housing provided with a cavity and a slot communicating with the cavity and arranged for permitting sliding movement of a kingpin, and a member adapted to mount a kingpin and movably arranged in said cavity in substantially continuous peripheral contact with said housing for forming a piston; and
    b. means for releasably holding the kingpin in a predetermined position, the holding means including passage means for passing a fluid from a one end to another spaced end of the cavity by passing around the member.

2. A structure as defined in claim 1, wherein the holding means further includes a valve arranged in the passage means, the passage means and valve forming a lock for the member when the valve is in a passage means blocking position.

3. A structure as defined in claim 2, wherein a hydraulic fluid fills said cavity.

4. Apparatus for selectively varying the position of a kingpin in relation to a trailer, comprising, in combination:
    a. means for movably mounting a kingpin on a trailer for shifting axle loads, the mounting means including an enclosed, hollow housing provided with a cavity and a slot communicating with the cavity for a kingpin to pass through, and a member adapted to mount a kingpin and movably arranged in said cavity in substantially continuous peripheral contact with said housing for forming a piston; and
    b. means for releasably holding the kingpin in a predetermined position, the holding means including passage means for passing a fluid from one end to another, spaced end of said cavity by passing around said member, and a valve arranged in said passage means, said passage means and valve forming a lock for said member when said valve is in a passage means blocking position.

5. A structure as defined in claim 4, wherein a hydraulic fluid fills said passage means and cavity.

6. A kingpin assembly for a trailer, comprising, in combination:
    a. a kingpin;
    b. means for removably mounting said kingpin on a trailer for shifting axle loads, the mounting means including an enclosed, hollow, fluid-tight housing provided with a cavity and a slot communicating with said cavity, and a member movably arranged in said cavity in substantially continuous peripheral contact with said housing for forming a piston, said kingpin mounted for movement with the piston; and
    c. means for releasably holding said kingpin in a predetermined position, the holding means including passage means for passing a fluid from a one end to another spaced end of the cavity by passing around the member.

7. A structure as defined in claim 6, wherein the holding means further includes a valve arranged in the passage means, the passage means and valve forming a lock for the member when the valve is in a passage means blocking position.

8. A structure as defined in claim 7, wherein a hydraulic fluid fills said cavity.

9. A kingpin assembly for a trailer, comprising, in combination:
    a. a kingpin;
    b. means for movably mounting said kingpin on a trailer for shifting axle loads, the mounting means including an enclosed, hollow, fluid-tight housing provided with a cavity and a slot communicating with said cavity, and a member movably arranged in said cavity in substantially continuous peripheral contact with said housing for forming a piston, said kingpin mounted on said member for movement therewith and arranged passing through said slot; and
    c. means for releasably holding said kingpin in a predetermined position, the holding means including passage means for passing a fluid from a one end to another, spaced end of said cavity by passing around said member, and a valve arranged in said passage means, said passage means and valve forming a lock for said member when said valve is in a passage means blocking position.

10. A structure as defined in claim 9, wherein a hydraulic fluid fills said passage means and cavity.

* * * * *